United States Patent

Mackey

[15] 3,647,238

[45] Mar. 7, 1972

[54] HANDTRUCK

[72] Inventor: Charles L. Mackey, Boynton Beach, Fla.

[73] Assignee: Trio Machine and Manufacturing Company, Inc., Willoughby, Ohio

[22] Filed: Dec. 15, 1969

[21] Appl. No.: 884,964

[52] U.S. Cl.................................280/47.29, 280/47.17
[51] Int. Cl.........................................B62b 1/12
[58] Field of Search............280/47.17, 47.24, 47.27, 47.28, 280/47.29, 47.37

[56] References Cited

UNITED STATES PATENTS

| 571,705 | 11/1896 | Thomas | 280/47.29 |
|---|---|---|---|
| 1,484,864 | 2/1924 | Bompart | 280/47.29 X |
| 2,198,918 | 4/1940 | Mercil | 280/47.27 |
| 2,392,955 | 1/1946 | Stalcup | 280/47.29 |
| 2,903,082 | 9/1959 | Marcus | 280/47.37 X |
| 3,157,411 | 11/1964 | Rhodes | 280/47.29 |

FOREIGN PATENTS OR APPLICATIONS

| 667,386 | 2/1952 | Great Britain | 280/47.29 |

Primary Examiner—Benjamin Hersh
Assistant Examiner—Leslie J. Paperner
Attorney—Robb & Robb

[57] ABSTRACT

The disclosure hereof is of a handtruck which includes a load support mounted on a wheel and axle assembly, with a handle unit likewise connected to said wheel and axle assembly, both pivotally related, and means to interconnect the said support and handle unit for simultaneous movement, in various adjusted positions so that the handtruck and its load may be manipulated either to maintain the load support at a generally level attitude, or to change the same depending upon the type of load to be carried thereon, the adjustment being effected by simple means which are manipulatable from the handle unit as may be necessary or desirable.

1 Claims, 5 Drawing Figures

PATENTED MAR 7 1972 3,647,238
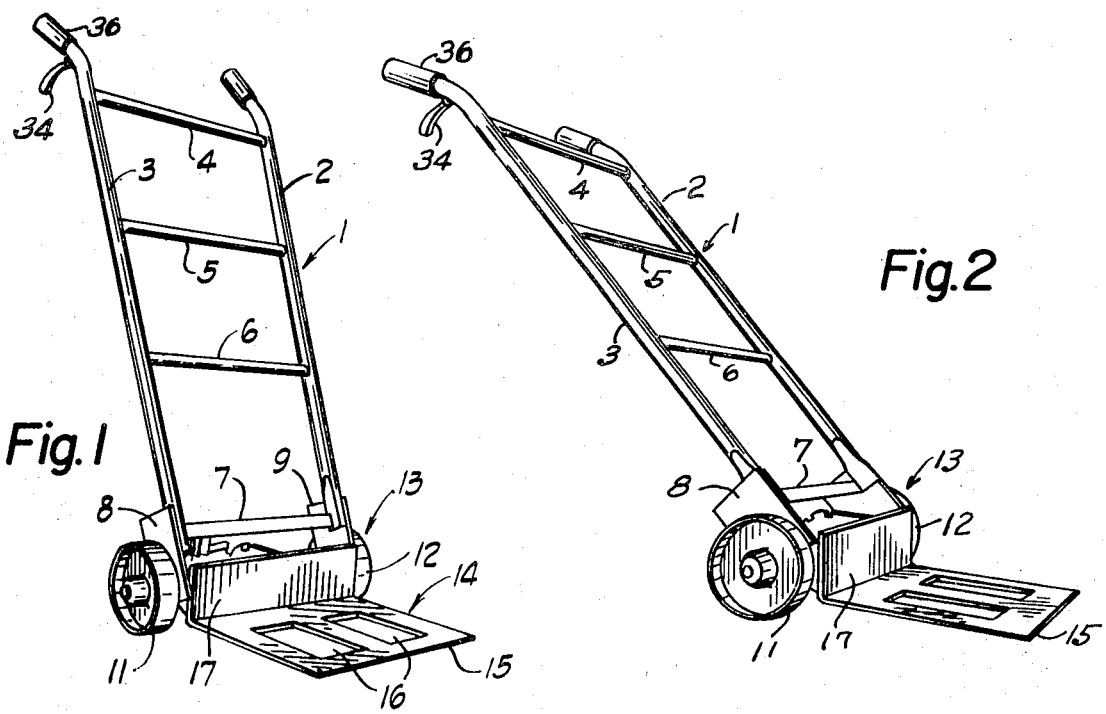
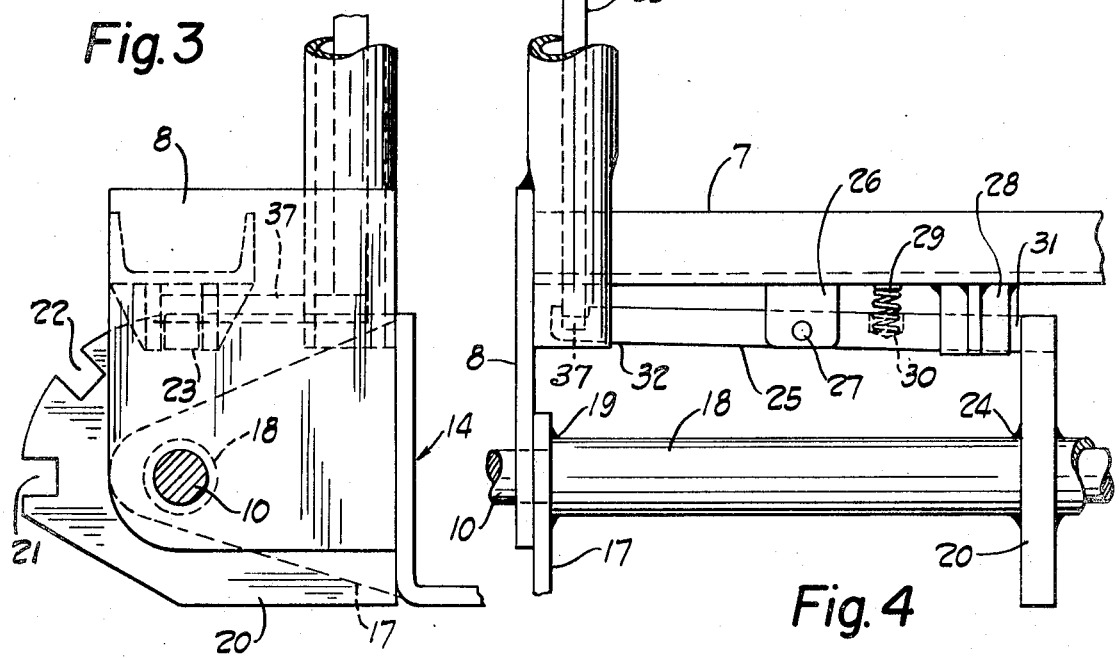
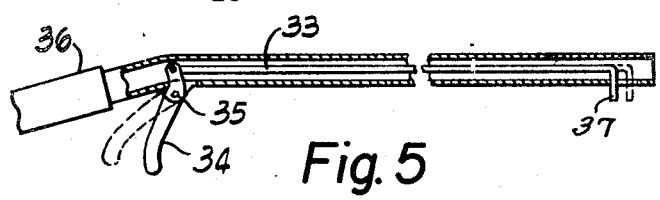
INVENTOR.
CHARLES L. MACKEY
BY Robb & Robb
attorneys

HANDTRUCK

THE INVENTION

A principal object of the invention herein, is to provide a handtruck which will have varying leverage positions to raise the load to be carried thereby from one position into another, or to maintain the same in substantially the initial attitude during transport, with various adjusted positions possible to be carried out so that depending upon the load—the relationships sought may be established and maintained.

A further object of the invention is to provide a handtruck which is of simple construction, involving a load support pivoted to a wheel and axle assembly, a handle unit likewise pivoted thereto with simple means to interconnect the same in varying positions for transport purposes as well as leverage purposes.

Another object of the invention is to construct a handtruck in which the various elements will be as simple as possible, the interconnecting means being controllable from adjacent one of the handle portions usually associated with such handtrucks, and positive interconnection of the respective parts being effected as desired.

Another object of the invention is to provide a handtruck in which a load support of substantial extent is provided, and which may be used to raise and lower various loads from positions adjacent the floor or other position in which the handtruck is to be transported, so that where heavy loads are involved it can be raised just slightly from the floor and yet control of the handtruck effected during transport operation thereof.

Other and further objects of the invention will be understood from a consideration of the specification appended hereto and disclosed in the drawing, wherein:

FIG. 1 is a perspective view of the handtruck of this invention in one position.

FIG. 2 is another perspective view of the handtruck of this invention in a different position.

FIG. 3 is an enlarged fragmentary view of portions of the means to interconnect the handle unit and load support.

FIG. 4 is a fragmentary view, taken from the right-hand side of FIG. 3, and further illustrating the interconnecting means.

FIG. 5 is a fragmentary view of one of the handle members and side rails of the handle unit.

The handtruck of this invention comprises a handle unit generally designated 1, which includes a pair of spaced side rails 2 and 3 preferably of round, tubular configuration being spaced one from the other by means of spacer bars 4, 5 and 6, and at the lower extremity of said side rails 2 and 3, a suitable beam 7 interconnects the same.

At the lower ends of the rails 2 and 3, suitable brackets such as 8 and 9 being provided, and as indicated in FIG. 3, these brackets such as 8 for example, are pivotally mounted on an axle 10, which axle extends transversely of the lift truck and includes wheels 11 and 12 thereon, the axle and wheels comprising a wheel and axle assembly generally designated 13.

The load support generally designated 14 comprises a support member 15 of any preferred configuration, in this instance generally rectangular having the openings 16 therein to lighten the same, with an upstanding back portion 17, preferably integral with the part 15.

Extending rearwardly so to speak from the load support 14 are suitable arm parts indicated in dotted lines at 17 for example in FIG. 3, and in full lines in FIG. 4, but only fragmentarily disclosed therein.

These arm parts 17 are in turn fastened to an axle housing 18 which is a tubular member extending from side to side of the lift truck, and being secured to the arm parts 17 as by welding at 19.

It will be apparent therefore that the arm part 17 will facilitate the pivotal movement of the load support 14 about the axle 10.

Intermediate the arm part 17, is a latch plate 20 shown in elevation in FIG. 3 as having a series of notches 21, 22 and 23 therein, it being remembered that the latch plate 20 is securely fastened to the housing 18 as by the welding indicated at 24.

Suitably mounted on the beam 7 to a dog 25 by means of spaced pivotal members 26 having a pivot 27 extending therebetween and upon which the dog 25 is mounted. The dog 25 is guided by means of the guide parts 28 at one end, these parts likewise being fixed to the beam 7 with a spring indicated at 29 engaged in a socket 30 at one end, and pressing against the beam 7 at the other, whereby a maintain the dog 25 in the position shown in FIG. 4, whereby the end 31 thereof is engaged with the notch 23 for example.

The other end of the dog 25 designated 32, is arranged to be engaged by the extremity of a trigger bar 33 which extends up through the side rail 3 as indicated in FIG. 5, so that its upper end is engaged by a trigger 34, pivotally mounted at 35 on the side rail 3 adjacent the handgrip portion 36 of said side rail.

It should be noted that the lower end of the trigger bar 33 includes an arm extension 37 integral with the bar 33, and extending outwardly so as to engage with the end 32 of the dog 25.

It will therefore be understood that by manipulation of the trigger 34, the bar 33 may be pushed downwardly for example with the arm 37 at the end thereof engaging the dog 25 to move the same about the pivot 27 and effect disengagement of the end 31 of said dog with the latch plate 20 whereby relative adjustment of the hand unit 1 and load support 14 may be effected.

It will be understood that varying positions of the load support and handle unit are desirable to effect because of the weight perhaps of the object being transported, or for other reasons which may occur to the operator of the device.

I claim:

1. In a handtruck of the class described, in combination, a wheel and axle assembly including an axle and wheels on the ends thereof, a housing member mounted on said axle, laterally spaced arm parts secured to said housing at one end, a load support pivotally connected to the wheel and axle assembly, the load support being mounted at the other end of said housing from the spaced arm parts to provide for pivoting of the support on the axle, a latch plate secured to said housing for movement therewith, a handle unit mounted on the axle assembly including handgrip portions and side rails connected together by transverse parts, the handgrip portions being remote from the connection of said unit and the axle, the ends of the rails having brackets fastened thereto and pivotally engaging the axle, and control means extending from adjacent at least one handgrip portion to dog means interconnecting the latch plate and handle unit, said dog means connecting said units in varying pivoted positions with respect to one another, the dog means comprising a dog pivotally mounted on the handle unit, the control means comprising a pivotally mounted trigger at the said one hand portion, a rigid trigger bar extends from said trigger to one side rail to a point adjacent one end of the dog, downward pushing movement of said trigger bar effecting pivotal movement of the dog and disengagement of the same from the latch plate whereby to disengage the said means from the latch plate to vary the pivotal positions and enable pivotal movement of said support on said axle.

* * * * *